United States Patent [19]

Oda et al.

[11] Patent Number: 5,902,761

[45] Date of Patent: May 11, 1999

[54] CERAMIC GRANULES, PROCESS FOR PREPARING THE SAME, AND PROCESS FOR PRODUCING SINTERED PRODUCT OF SILICON NITRIDE

[75] Inventors: Takehiro Oda; Yuji Higashi, both of Kokubu, Japan

[73] Assignee: Kyocera Corporation, Kyoto, Japan

[21] Appl. No.: 08/826,306

[22] Filed: Mar. 27, 1997

[30] Foreign Application Priority Data

Mar. 29, 1996  [JP]  Japan .................................. 8-077847

[51] Int. Cl.$^6$ .................................................. C04B 35/587
[52] U.S. Cl. ........................ 501/97.1; 501/97.2; 264/647; 264/683
[58] Field of Search ................. 501/97.1, 97.2; 264/647, 683

[56] References Cited

U.S. PATENT DOCUMENTS

| | | | |
|---|---|---|---|
| 4,492,665 | 1/1985 | Pompe | 501/97.2 |
| 5,308,561 | 5/1994 | Leimer et al. | 501/97.2 |
| 5,591,687 | 1/1997 | Kita et al. | 501/97.2 |
| 5,720,919 | 2/1998 | Boberski et al. | 501/97.1 |

*Primary Examiner*—Karl Group
*Attorney, Agent, or Firm*—Loeb & Loeb LLP

[57] ABSTRACT

Ceramic granules for producing sintered products of silicon nitride that can be favorably used as structural materials for various heat engines such as automotive parts, gas turbines and the like, and as abrasion resistant materials and corrosion resistant materials. A process for preparing the ceramic granules and a process for preparing sintered products of silicon nitride by using the ceramic granules. Ceramic granules comprise a mixture of a silicon nitride powder, a silicon powder and an assistant, as well as an organic binder, said ceramic granules having an average particle diameter of from 50 to 300 $\mu$m and a relative density of from 18 to 30%.

22 Claims, No Drawings

CERAMIC GRANULES, PROCESS FOR PREPARING THE SAME, AND PROCESS FOR PRODUCING SINTERED PRODUCT OF SILICON NITRIDE

BACKGROUND OF THE INVENTION

1. Field of the Invention

The present invention relates to ceramic granules for producing sintered products of silicon nitride that can be favorably used as structural materials for various heat engines such as automotive parts, gas turbines and the like, and as abrasion resistant materials and corrosion resistant materials like aluminum melt. The invention further relates to a process for preparing the ceramic granules and to a process for producing sintered products of silicon nitride by using the ceramic granules and, particularly, to a process for producing sintered products of silicon nitride that can be favorably used as parts that require high dimensional precision.

2. Description of the Prior Art

Owing to their excellent strength, heat resistance, shock resistance, abrasion resistance, corrosion resistance and light weight, sintered products of silicon nitride have been used as engineering ceramics and, particularly, as structural materials for heat engines such as turbo rotors and the like components, and as abrasion resistant members. Since the sintered products of silicon nitride exhibit difficultly sintering property, however, oxides of elements of the Group 3a of periodic table such as $Y_2O_3$ and $Sc_2O_3$ as well as aluminum oxide have been used as sintering assistants for preparing sintered products having high density and large strength.

In order to produce a sintered product having a high dimensional precision while suppressing contraction due to firing, furthermore, there has been proposed in U.S. Pat. No. 4,351,787 a process in which a mixture powder of a metallic silicon powder and a sintering assistant is formed, the mixture powder is heated in nitrogen at a temperature of not higher than 1300° C. to nitrogenate the metal silicon into the silicon nitride, and is then heated at a temperature of not lower than 1600° C. to increase the density. Japanese Patent Publication No. 24789/1990 discloses a process for nitrogenating and sintering a molded article comprising a metallic silicon powder, a silicon nitride powder, an oxide powder of an element of the Group 3a of periodic table and an aluminum oxide powder.

As the methods of molding the ceramics, furthermore, dry-type pressurized molding methods (inclusive of metal mold press method, rubber press method, rolling method, etc.) have heretofore been employed as convenient mass-production methods.

The dry-type pressurized molding method include a molding method in which the mixed starting materials are directly pressurized and are molded, as well as a method in which the coagulated granules (secondary particles) are prepared from the mixed starting material powder, and the granules are pressurized and smashed to prepare a molded article. In particular, the latter method is much used for the mass production since it features excellent powder filling performance permitting continuous molding. As a method of preparing such granules, a spray-drying method is now most generally used according to which a slurry suspension obtained by dispersing the mixed starting materials in a suitable solvent is spray-dried.

According to the spray-drying method in which the suspension on the slurry is sprayed into a container of a high temperature to form granules by quick drying, however, it is not possible to control the density of particles in the granules arousing a problem in that dispersion takes place among the production lots. Furthermore, the granules prepared by the spray-drying method that are pressurized during the molding under the application of pressure, are less smashed and form space among the granules. Therefore, large voids are formed in the sintered product causing the mechanical properties to be varied.

When a sintered product of silicon nitride is prepared through a step of nitrogenating the metallic silicon powder in nitrogen, the nitrogenation takes place based upon a reaction between the metallic silicon powder in the molded article and the nitrogen gas in the atmosphere. To prepare a sintered product having excellent dimensional precision, high density and large strength, it is essential that the metal silicon powder in the molded article is completely nitrogenated and the molded article after nitrogenated has a high density and homogeneous texture. When the mixed starting materials containing the metallic silicon powder are simply molded under the application of pressure to obtain a molded article, however, the molded article after nitrogenated acquires a low density and exhibits a decreased dimensional precision though the metallic silicon may easily react with the nitrogen gas during the nitrogenation. On the other hand, when the mixed starting materials are granulated to form ceramic granules and are molded, there can be obtained a molded article having a relatively high density. Depending upon the properties of the ceramic granules, however, the voids and density of the molded article undergo a change after it is molded under the application of a pressure, making it difficult to stably obtain a sintered product having excellent properties.

SUMMARY OF THE INVENTION

It is, therefore, an object of the present invention to provide ceramic granules that are suited for producing a sintered product of silicon nitride having excellent dimensional precision, and exhibit excellent particle flow property and smashing property during the molding under the application of pressure, making it possible to obtain a highly dense and homogeneous molded article, as well as to provide a process for producing the ceramic granules.

Another object of the present invention is to provide a process for producing a sintered product of silicon nitride having a large strength which is suited for producing articles of complex shapes, contracts little during the firing, has a maximum void diameter which is not large, and exhibits a small dispersion in the mechanical properties.

In order to accomplish the above-mentioned objects, the present inventors have conducted a study concerning the ceramic granules, have discovered the fact that the ceramic granules exhibit excellent flowing property and smashing property during the molding under the application of pressure when the granules have an average particle size of from 50 to 300 $\mu$m and a relative density of from 18 to 30% after the binder is decomposed and removed, making it possible to obtain a highly dense molded article and, hence, to obtain a sintered product which contracts little upon nitrogenation and firing, and exhibits small dispersion in the mechanical properties, and have thus arrived at the present invention.

According to the present invention, there are provided a ceramic granule comprising a powder mixture of a silicon nitride containing not less than 50% of α-silicon nitride, a silicon and an assistant and an organic binder, wherein said ceramic granule has an average particle diameter of from 50 to 300 μm and has a relative density defined by the following formula:

$$A(\%) = (B/C) \times 100$$

wherein A(%) stands for relative density, B stands for a powder bulk density defined by the formula B(g/cm$^3$)= W(g)/100 (cm$^3$), W(g) is a weight of an organic binder removed granule loosely filled in a 100 cm$^3$ capacity cylindrical vessel, C stands for a theoretical true density of silicon nitride, silicon and assistant mixture, of from 18 to 30%, and the powder mixture of the silicon nitride, silicon and assistant has a cumulative particle diameter (D90) calculated by integrating a particle size distribution diagram, of not less than 1 μm and of not greater than 5 μm.

PREFERRED EMBODIMENTS OF THE INVENTION

The ceramic granules according to the present invention comprise a mixture powder of a silicon nitride powder, a silicon powder and an assistant, as well as an organic binder. It is important that the silicon nitride powder contains not less than 50% of α-silicon nitride (to be referred to as α-ratio), particularly, not smaller than 70% and, more particularly, not smaller than 80%. When the silicon nitride powder has an α-ratio of not smaller than 50%, the silicon nitride formed by nitrogenating the silicon powder becomes a highly α-type, and acquires a needle-like texture having a large aspect ratio when it is heated at a temperature of from 1700 to 2000° C. to increase its density and, hence, exhibits a large strength When the α-ratio is smaller than 50%, therefore, the sintered product that is finally obtained fails to exhibit mechanical strength to a satisfactory degree.

It is further desired that the silicon nitride (Si$_3$N$_4$) powder and the silicon (Si) powder are blended at a weight ratio Si/(Si$_3$N$_4$+Si) of from 0.2 to 0.95. When the amount of silicon is larger than this ratio, the nitrogenation proceeds difficultly, silicon remains, and the temperature may rise out of control due to the exothermic reaction. When the amount of silicon is smaller than the above-mentioned range, contraction takes place to a large extent due to firing and it become necessary to machine the sintered product. From the standpoint of cost, it is desired that the amount of silicon is larger than the amount of silicon nitride and their weight ratio is not smaller than 0.5 and, particularly, not smaller than 0.6.

The assistant may include the one for promoting the sintering and the one for promoting the nitrogenation. It is desired that the assistant for promoting the sintering contains a powder of an oxide of an element of the Group 3a of periodic table and an aluminum oxide powder. These assistants are indispensable for enhancing the density. In particular, the oxide of an element of the Group 3a of periodic table contributes to forming silicon nitride crystals of a needle shape, and the aluminum oxide contributes to increasing the density.

It is desired that the amounts of these sintering assistants are such that the oxide of an element of the Group 3a of periodic table is from 1 to 7 mol % and the aluminum oxide is from 1 to 13 mol %. This is because when the amount of the oxide of an element of the Group 3a of periodic table exceeds 7 mol % or when the amount of the aluminum oxide exceeds 13 mol %, the sintered product loses characteristics at high temperatures and the assistants are segregated resulting in the occurrence of color shading of the sintered product. Furthermore, when their contents are smaller than 1 mol %, the density and strength decrease. The contents of these sintering assistants are the ratios of when the amounts of Si$_3$N$_4$+Si reckoned as Si$_3$N$_4$+sintering assistants=100%.

According to the present invention, silicon oxide powders other than those described above can be blended as sintering assistants. The silicon oxide (SiO$_2$) works as a sintering assistant. It is further considered that a silicon powder and oxygen unavoidably contained in the silicon nitride powder are also existing in the form of silicon oxide. Therefore, the SiO$_2$ powder can be added to adjust the amount of the SiO$_2$ component. It is desired that the SiO$_2$ component inclusive of the silicon powder and the oxygen component contained in the silicon nitride powder reckoned as SiO$_2$, are contained in an amount of from 1 to 25 mol % in the whole amount when silicon in the mixture powder is converted into silicon nitride.

As an assistant for promoting the nitrogenation, furthermore, it is desired to blend at least one or more of oxides, carbides and suicides of W, Mn, Fe and Cu in an amount of from 0.1 to 5 parts by weight, particularly, from 0.1 to 3 parts by weight and, more particularly, from 0.1 to 1 part by weight per 100 parts by weight of the sum of the silicon nitride, silicon (reckoned as Si$_3$N$_4$) and the above-mentioned sintering assistants. They work to promote the subsequent nitrogenation reaction. Among them, WO$_3$ and MnO$_2$ are particularly preferred. When used in an amount of smaller than 0.1 part by weight, the nitrogenation promoting assistant fails to exhibit its effect for promoting the nitrogenation. When used in an amount of larger than 5 parts by weight, the nitrogenation promoting assistant turns into a foreign matter in the sintered product to deteriorate the strength. It is desired that the nitrogenation promoting assistant has an average particle diameter of as fine as not larger than 1 μm.

It is essential that the mixture powder comprising the silicon nitride powder, silicon powder and assistant has a cumulative particle diameter of the primary starting materials of from 1 to 5 μm and, preferably, from 1 to 3 μm. This is because, when the cumulative particle diameter exceeds 5 μm, the granules being prepared are not coagulated to a sufficient degree and are not granulated. When agitation and granulated, furthermore, the granules lose flowing property.

When the cumulative particle diameter is smaller than 1 μm, cracking tends to occur at the time of molding. At the time of nitration, nitration reaction runs away so that the temperature rises and silicon tends to be melted.

It is desired that the organic binder has a viscosity at 80° C. of not larger than 10$^6$ poises. For example, it is desired to use an organic resin such as butyral resin or montan wax. A plasticizer such as dibutyl phthalate may also be contained. When the viscosity at 80° C. is larger than 10$^6$ poises, the binder cannot be homogeneously mixed into the primary starting materials; i.e., the binder does not infiltrate into the granules and voids are formed in the sintered product after the firing.

The organic binder is blended in an amount of 4 to 25 parts by weight per 100 parts by weight of the mixture powder of silicon nitride powder, silicon powder and assistant. When the amount of the organic binder is smaller than 4 parts by weight, the granulation takes place less and the granules lose flowing property. When the amount of the organic binder is larger than 25 parts by weight, the granules turn into a slurry which cannot be granulated. Particularly desirably, the organic binder is used in an amount of from 6 to 20 parts by weight per 100 parts by weight of the mixture powder.

The mixture powder prepared as described above and the organic binder are mixed together at the above-mentioned ratio to prepare ceramic granules.

According to the present invention, it is important that the ceramic granules have an average particle diameter of from 50 to 300 μm, particularly, from 70 to 250 μm and, more particularly, from 100 to 200 μm, and a relative density after the binder is decomposed and removed of from 18 to 30%, particularly, from 20 to 28% and, more particularly, from 20 to 25%. When the average particle diameter is smaller than 50 μm, the granules do not flow to a satisfactory degree. That is, in the continuous molding operation using a hopper or the like, the granules fail to flow homogeneously in the hopper; i.e., the homogeneously molded product is not stably produced and the mass-production is not accomplished. When the average particle diameter is larger than 300 μm, on the other hand, the granules flow favorably, but large voids remain among the granules, and the voids cannot be completely crushed by the pressure during the molding. Accordingly, large voids are formed in the sintered product causing the mechanical strength to be decreased.

The relative density A(%) of the granules is defined by the following formula:

$$A(\%) = (B/C) \times 100$$

wherein A(%) stands for relative density, B stands for a powder bulk density defined by the formula, $$B(g/cm^3) = W(g)/100 \ (cm^3)$$

W(g) is a weight of an organic binder removed granule loosely filled in a 100 $cm^3$ capacity cylindrical vessel, C stands for a theoretical true density of silicon nitride, silicon and assistant mixture.

In the practical measurement, W(g) is the weight of the granules of when the granules from which the organic binder has been removed are thrown onto a standard sieve having a mesh size of 2.38 mm, the granules falling through the sieve openings are received by a container having an inner diameter of 50 cm and a capacity of 100 $cm^3$ that is placed 20 cm under the sieve, and when this container is filled with the granules. In order to obtain the organic binder removed granules, an organic binder containing granule is heat-treated at a temperature of from 500 to 800° C.

When the relative density of the granules is smaller than 18%, the granules become so soft that they easily collapse during the handling and lose flowing property. When the relative density A is larger than 30%, on the other hand, the molded article contracts little by firing, which is an advantage. However, the granules are densely packaged and are not crushed during the molding under the application of pressure. That is, large pores remain in the molded article and, hence, voids remaining in the sintered product cause the mechanical strength to decrease.

A granulation method with agitating is most desired for producing the ceramic granules. According to the spray-drying method that has heretofore been much used, the suspension on the slurry is sprayed into a container of a high temperature to form granules by quick drying. Therefore, it is difficult to control the density of the granules and dispersion in the properties occurs among the lots. According to the granulation method with agitated, on the other hand, the mixture powder and the organic binder are thrown into the container and are agitation in the container by rotating the agitation vanes. Then, the powder and the organic binder gradually coagulate to form granules. The size of the granules increases with an increase in the agitated time and the relative density of the granules increases, too. By controlling the agitated conditions such as agitated time, etc., therefore, the size of the granules and the relative density can be controlled to assume desired values.

Next, according to the process for producing a sintered product of silicon nitride, a molded article is obtained by using the granules prepared as described above. The molded article is obtained by the press-molding method. The press-molding method may include a metal mold press method according to which a metal mold having the shape of a final product is filled with the granules followed by the application of a pressure, a rubber press method according to which a flexible mold made of a rubber or the like material is filled with the granules, sealed, and is pressurized by using a liquid such as water or oil as a pressure medium, and a method according to which the granules are permitted to flow through a pair of rollers and are molded into a sheet by the pressure between the rollers. The pressure during the pressurized molding will be from 500 to 3000 $kg/cm^2$. It is desired that the molded article obtained by the pressurized molding has a relative density of from 40 to 65%. This is because, when the relative density of the molded article is lower than 40%, the article contracts to a large extent during the firing and when the relative density is larger than 65%, lamination (cracks) tends to occur in the molded article. When no silicon powder is contained, the relative density tends to become low and the molded article contracts to a large extent due to the firing.

The molded article is then heat-treated at 500 to 800° C. in a non-oxidizing atmosphere to decompose and remove the organic binder in the molded article.

The silicon powder contained in the molded article is transformed into the silicon nitride by nitrogenating the molded article at 1000 to 1500° C. and, particularly, at 1100 to 1400° C. in a nitrogen atmosphere. It is desired that the partial pressure of nitrogen in this case is from 0.1 to 10 atms and, particularly, from 0.5 to 5 atms. Since the relative density of the molded article is enhanced owing to the nitrogenation reaction, the contraction of the molded article is decreased in the subsequent step of sintering. It is desired that the molded article after the nitrogenation has a density of not smaller than 40% and, particularly, not smaller than 50%. This is because, when the density of the molded article after the nitrogenation is smaller than 40%, the molded article contracts to a large extent by the firing.

In order to increase the density, furthermore, the molded article after the nitrogenation is fired at a temperature of from 1700 to 2000° C. by a known firing method such as normal-pressure firing method or a pressurized nitrogen gas firing method under a nitrogen pressure of from 1.5 to 200 atms. The density can be further increased by subjecting the thus obtained sintered product to the hot isostatic press (HIP) processing in a nitrogen or argon atmosphere under a pressure of 1000 to 2000 atms.

The firing may be effected in the same firing furnace following the above-mentioned step of nitrogenation. However, the step of nitrogenation and the step of firing may be effected in separate firing furnaces. When these steps are to be separately effected, the hot press method or the glass bath HIP method may be employed for the step of firing.

According to the process of the present invention for obtaining a sintered product by nitrogenating and firing a molded article which contains a silicon powder, first, ceramic granules having a predetermined size and a predetermined relative density are obtained by using an organic binder and a mixture powder containing a silicon nitrogen powder, a silicon powder and a sintering assistant, and a molded article is obtained by the pressurized molding method. The molded article features a high relative density being uniformly packaged with the primary starting materials. When the molded article is nitrogenated in nitrogen, therefore, the silicon powder in the molded article is uniformly nitrogenated making it possible to obtain a nitrogenated molded article having a high relative density. The molded article is then fired to obtain a dense and homogeneous sintered product which is contracted by not more than 20% by firing and has a maximum void diameter of not larger than 60 $\mu$m.

It is possible to further increase the mechanical strength of the sintered product by setting the weight ratio of silicon nitride to silicon (Si/Si+Si$_3$N$_4$) in the ceramics composition to be 0.2–0.95, using the oxide of an element of the Group 3a of periodic table as a sintering assistant in an amount of 1 to 7 mol %, using the aluminum oxide in an amount of 1 to 13 mol %, and adding compounds of W, Mn, Fe or Cu.

In producing a sintered product of silicon nitride having a high dimensional precision by the press-molding method, as described above, the ceramic granules of the present invention exhibit excellent smashing property and flowing property, and makes it possible to obtain a sintered product which has a small dispersion in the mechanical properties and is contracted little by firing.

EXAMPLES

Example 1

A silicon powder having an average particle size of 2.5 to 20 $\mu$m, a silicon nitride powder having an $\alpha$-ratio of 90% and an average particle diameter of 1.0 $\mu$m, an oxide of an element of the Group 3a of periodic table having an average particle diameter of 1.0 $\mu$m, and a powder shown in Table 1 were pulverized and mixed together, and were then dried and passed through a stainless steel sieve. The particle size distribution of the mixture powder was measured in regard to its 90% integral particle diameter (D90). The results were as shown in Table 1.

To 100 parts by weight of the mixture powder were added 7 parts by weight of a powdery polyvinyl butyral of a size of not larger than 100 $\mu$m as an organic binder and 7 parts by weight of a dibutyl phthalate (plasticizer). The mixture was agitation in a agitator heated at 100° C. to prepare ceramic granules. The viscosity of the binder at 80° C. was 7×10$^2$ poises. The obtained ceramic granules were measured for their average particle diameter and for their relative density by the methods described above.

The ceramic granules were charged into a metal mold and were monoaxially pressed under a molding pressure of 0.8 tons/cm$^2$ to obtain a molded article having a diameter of 60 mm and a thickness of 30 mm. The molded article was treated at 550° C. in a nitrogen atmosphere to decompose and remove the organic binder, and was then nitrogenated in a nitrogen atmosphere at 1200° C. under a pressure of 5 atms for 10 hours. The molded article after the nitrogenation was measured for its density by the Archimedes' method. The molded article after the nitrogenation was fired in a nitrogen atmosphere of a pressure of 10 atms at a firing temperature shown in Table 1 for 8 hours. The molded article before and after the firing was measured for its size to find a shrinkage rate caused by firing. The shrinkage rate by firing was found according to [1—(diameter of the molded article after firing/diameter of the molded article before firing)]×100 (%).

The obtained sintered product was measured for its four-point bending flexural strength at room temperature and at 1000° C. based on JISR-1601. Table 1 shows average values (Av) and minimum values (mi.) of the strength of 30 test pieces of each of the samples. Furthermore, the mirror surface of the sintered product was observed by using an electron microphotograph to find a maximum void diameter.

The sample 1-1 in Table 1 is the one obtained by preparing the ceramic granules in the same manner as described above by using a mixture powder without containing silicon in the primary starting materials based upon the press-molding method, followed by firing at a temperature shown in Table 1 without passing through the step of nitrogenation.

Example 2

To the mixture powder prepared in the same manner as in Example 1 was added methanol as a solvent to prepare a slurry suspension which was then spray-dried at 200° C. by the spray-drying method to prepare ceramic granules. The thus obtained granules were measured for their average particle diameter and relative density in the same manner. Each sample was prepared in 10 lots, and the relative density was found. Minimum values, maximum values and differences therebetween were as shown in Table 2. The granules were nitrated and fired in the same manner as described above. Minimum values and maximum values of the shrinkage rate by firing and the differences were as shown in Table 2.

Example 3

A butyral resin, a montan wax and a dibutyl phthalate that serves as a plasticizer were added at ratios shown in Table 3 to 100 parts by weight of a mixture powder obtained by adding 0.5 parts by weight of WO$_3$ to 100% by weight of main components comprising 70 mol % of a silicon powder (reckoned as Si$_3$N$_4$), 24.5 mol % of a silicon nitride powder, 2.5 mol % of Y$_2$O$_3$ and 3 mol % of Al$_2$O$_3$ and having D90 of the primary starting materials of 1.6 $\mu$m. The ceramic granules having a relative density of 24.0% and an average particle diameter of 150 $\mu$m were prepared by the granulation method with agitated.

By using the ceramic granules, the molded article was prepared in the same manner as in Example 1, and was nitrogenated at 1850° C. under a nitrogen partial pressure of 10 atms for 5 hours. The obtained sintered product was measured for its maximum void diameter and flexural strength in the same manner as in Example 1. The results were as shown in Table 3.

TABLE 1

| Sample No. | Main component composition (mol %)*1) Si (Si₃N₄) | Si₃O₄ | RE₂O₃ | Al₂O₃ | Others (parts by wt.)*2) | D90 (μm) of primary starting material | Granulation method | Relative density of ceramics (%) |
|---|---|---|---|---|---|---|---|---|
| *1-1 | — | 94.5 | Y₂O₃ 2.5 | 3 | WO₃ 1 | 1.5 | agitated | 25.3 |
| *1-2 | 78.5 | 16 | Y₂O₃ 2.5 | 3 | WO₃ 0.5 MnO₂ 0.5 | 2.7 | agitated | 17.0 |
| 1-3 | " | " | " | " | WO₃ 0.5 MnO₂ 0.5 | 2.2 | agitated | 19.3 |
| 1-4 | " | " | " | " | WO₃ 0.5 MnO₂ 0.5 | 1.5 | agitated | 22.4 |
| 1-5 | " | " | " | " | WO₃ 0.5 MnO₂ 0.5 | 1.9 | agitated | 25.5 |
| 1-6 | " | " | " | " | WO₃ 0.5 MnO₂ 0.5 | 2.6 | agitated | 25.3 |
| 1-7 | " | " | " | " | WO₃ 0.5 MnO₂ 0.5 | 4.0 | agitated | 24.2 |
| *1-8 | " | " | " | " | WO₃ 0.5 MnO₂ 0.5 | 5.5 | agitated | 22.7 |
| *1-9 | " | " | " | " | WO₃ 0.5 MnO₂ 0.5 | 14.2 | agitated | 20.7 |
| *1-10 | " | " | " | " | WO₃ 0.5 MnO₂ 0.5 | 1.6 | agitated | 19.0 |
| 1-11 | " | " | " | " | WO₃ 0.5 MnO₂ 0.5 | 1.6 | agitated | 20.2 |
| 1-12 | " | " | " | " | WO₃ 0.5 MnO₂ 0.5 | 1.6 | agitated | 25.6 |
| *1-13 | " | " | " | " | WO₃ 0.5 MnO₂ 0.5 | 1.6 | agitated | 26.6 |
| 1-14 | 59.5 | 35 | Yb₂O₃ 2.5 | 3 | WO₃ 1 MnO₂ 0.5 | 1.5 | agitated | 24.0 |
| 1-15 | 59.5 | 35 | Lu₂O₃ 2.5 | 3 | WO₃ 1 MnO₂ 0.5 | 1.8 | agitated | 23.5 |
| *1-16 | 94.5 | — | Y₂O₃ 2.4 | 3 | WO₃ 0.5 MnO₂ 0.5 | 2.5 | agitated | 25.5 |
| *1-17 | 78.5 | 16 | Y₂O₃ 2.4 | 3 | WO₃ 0.5 MnO₂ 0.5 | 1.6 | not granulated | — |

| Sample No. | Average particle diameter (μm) | Relative density of molded article (%) | Firing temperature (°C.) | Property of sintered product Shrinkage rate (%) | Property of sintered product Max. void diameter (μm) | Flexural strength at room temperature (Mpa) Av. | Flexural strength at room temperature (Mpa) min. |
|---|---|---|---|---|---|---|---|
| *1-1 | 170 | 39.2 | 1800 | 22.0 | 30 | 820 | 760 |
| *1-2 | | | | collapsed and did not flow | | | |
| 1-3 | 190 | 49.4 | 1900 | 18.0 | 20 | 860 | 800 |
| 1-4 | 130 | 55.0 | 1900 | 15.0 | 30 | 840 | 770 |
| 1-5 | 170 | 57.0 | 1900 | 14.0 | 30 | 820 | 760 |
| 1-6 | 190 | 57.2 | 1900 | 14.0 | 30 | 810 | 760 |
| 1-7 | 270 | 56.8 | 1900 | 14.2 | 60 | 780 | 690 |
| *1-8 | 320 | 56.0 | 1900 | 14.7 | 60 | 620 | 480 |
| *1-9 | 720 | 49.0 | 1900 | 18.5 | 120 | 530 | 310 |
| *1-10 | 40 | | | did not flow and was not molded | | | |
| 1-11 | 90 | 50.9 | 1900 | 17.6 | 20 | 860 | 790 |
| 1-12 | 260 | 64.9 | 1900 | 12.7 | 60 | 770 | 700 |
| *1-13 | 320 | 64.0 | 1900 | 13.0 | 100 | 590 | 420 |
| 1-14 | 150 | 56.6 | 1900 | 15.2 | 40 | 820 | 720 |
| 1-15 | 150 | 57.2 | 1900 | 15.5 | 30 | 850 | 760 |
| *1-16 | 180 | 56.8 | | insufficiently nitrosenated | | | |
| *1-17 | — | 38.6 | 1900 | 21.8 | 100 | 460 | 310 |

*1)The amount of Si is a ratio of when reckoned as Si₃N₄.
*2)Weight ratio (pts. by wt.) relative to 100 parts by weight of the main components.
*Those marked with * lie outside the scope of the invention.

TABLE 2

| Sample No. | Main component composition (mol %)*1) | | | | Others (prt. by wt.)*2) | D90 (μm) of primary starting materials | Granulation method | Relative density of ceramic granules (%) | | | Firing temp. (°C.) | Shrinkage rate (%) | | |
|---|---|---|---|---|---|---|---|---|---|---|---|---|---|---|
| | Si (Si$_3$N$_4$) | Si$_3$N$_4$ | RE$_2$O$_3$ | Al$_2$O$_3$ | | | | min. | max. | D*3) | | min. | max. | D*3) |
| 2-1 | 78.5 | 16 | Y$_2$O$_3$ 2.5 | 3 | WO$_3$ 0.5 MnO$_2$ 0.5 | 1.9 | agitated | 25.2 | 25.7 | 0.5 | 1900 | 13.8 | 14.2 | 0.1 |
| 2-2 | 78.5 | 16 | Y$_2$O$_3$ 2.5 | 3 | WO$_3$ 0.5 | 1.9 | sprayed | 26.0 | 30.1 | 4.1 | 1900 | 12.4 | 14.3 | 1.9 |

*1)The amount of Si is a ratio of when reckoned as Si$_3$N$_4$.
*2)Weight ratio (pts. by wt.) relative to 100 parts by weight of the main components.
*3)difference

TABLE 3

| Sample No. | Binder viscosity at 80° C. (poises) | Binder*4) Total amount (prts. by wt.) | Kind (prts. By wt.) | Max. void diameter (μm) | Flexural strength (MPa) | |
|---|---|---|---|---|---|---|
| | | | | | Av. | min. |
| 3-1 | 5 × 10$^6$ | 14 | resin 12 + plasticizer 2 | 120 | 430 | 300 |
| 3-2 | 9 × 10$^5$ | 14 | resin 11 + plasticizer 3 | 60 | 790 | 680 |
| 3-3 | 7 × 10$^2$ | 14 | resin 7 + plasticizer 7 | 50 | 800 | 710 |
| 3-4 | 2 | 8 | Wax 8 | 20 | 870 | 800 |
| 3-5 | 7 × 10$^2$ | 10 | resin 4.1 + plasticizer 5.9 | 40 | 800 | 720 |
| 3-6 | 7 × 10$^2$ | 25 | resin 10.3 + plasticizer 14.7 | 60 | 770 | 670 |
| 3-7 | 7 × 10$^2$ | 30 | resin 12.4 + plasticizer 17.6 | slurried and not granulated | | |

*4)weight ratio (prt. By wt.) relative to 100 parts by weight of the mixture powder.

From the results of Table 1, in the case of a sample No. 1-2 having a relative density of smaller than 18%, the granules collapsed during the preservation and the flowing property was deteriorated. In the case of samples Nos. 1-8 and 1-9 having a D90 in excess of 5 μm in the primary starting materials, the average particle size exceeded 300 μm and a maximum void diameter therein exceeded 60 μm. Accordingly, the strength was small.

In the case of a sample No. 1-13 having an average particle diameter of larger than 300 μm, a maximum void diameter therein exceeded 60 μm and the strength was small, though the D90 of the primary starting materials was smaller than 5 μm.

When the ceramic granules having a relative density of from 15 to 30% and an average particle diameter of from 50 to 300 μm were used in contrast with these comparative examples, the flowing property was improved and a maximum void diameter in the sintered product could be decreased to be smaller than 60 μm. Therefore, the sintered product exhibited improved mechanical strength and decreased dispersion in the characteristics.

When the spray-drying method was employed for preparing the ceramic granules, it was difficult to control the relative density of the granules among the lots as shown in Table 2, and conspicuous dispersion was observed among the lots. Therefore, the contraction by firing varied among the lots, and the sintered products after firing exhibited poor dimensional precision.

By using a binder having a viscosity at 80° C. of not larger than 10$^6$ poises as will be obvious from the results of Table 3, homogeneous ceramic granules in which the binder has infiltrated into the mixture powder were obtained and, hence, a molded article was obtained, making it possible to obtain a sintered product having a small maximum void diameter and a small dispersion in the characteristics.

Example 4
(Samples Nos. 4-1 to 4-15))

An Si$_3$N$_4$ powder having an α-ratio of 90% and an average particle diameter of 0.9 μm, and silicon powders having different particle sizes were used as main components. Then, 2.5 mol % of a Y$_2$O$_3$ powder having an average particle diameter of 5 μm, 3.0 mol % of an Al$_2$O$_3$ powder having an average particle diameter of 1 μm were added thereto as sintering assistants and, besides, an SiO$_2$ powder was added thereto in such an amount that the total amount with oxygen component included in the silicon powder or in the Si$_3$N$_4$ powder which is the main component reckoned as SiO$_2$ was 5 mol %. Moreover, powders of oxides, carbides and suicides of W, Mn, Fe and Cu were added as nitrogenation promoting agents. The amounts of addition were as shown in Table 4.

The above powders were pulverized in an isopropyl alcohol for 50 hours and were mixed. The mixture powder was measured for its particle size distribution in order to calculate its D90. The mixture powder was then dried, and to which was added a binder having a viscosity at 80° C. of 7×10$^2$ poises in order to prepare ceramic granules having a relative density of 24% and an average particle diameter of 180 μm by the granulation method with agitated. By using the granules, a flat plate-like molded article having a thickness of 10 mm and a relative density of 50 to 55% was formed by a pressed metal mold. Then, the binder was removed from the molded article in a nitrogen atmosphere at 500° C. The molded article was nitrogenated in the atmosphere of a nitrogen partial pressure of 0.5 atoms (nitrogenation pattern 1) or of 1 atm (nitrogenation pattern 2) at 1300° C. for 5 hours.

Samples were cut from the molded articles after the nitrogenation to observe the cross section and to check the residual silicon by the X-ray diffraction method. The results were as shown in Table 4.

According to the results of Table 4, when the starting silicon powder possessed a particle size of smaller than 2.5 μm (samples Nos. 4-1 and 4-7) in either the nitrogenation pattern 1 or 2, the D90 after pulverization and mixing became smaller than 1 μm. Therefore, silicon was melted and coagulated in the central portion of the samples due to heat produced by the quick nitrogenation reaction irrespective of the presence or absence of the nitrogenation promoting agent. In the nitrogenation pattern 2, furthermore, the residual silicon was not confirmed when the starting silicon powder possessed a particle diameter of larger than 2.5 μm (samples Nos. 4-2 and 4-5). When the nitrogenation promoting agent was added (samples Nos. 4-8 to 4-15), however, no residual silicon was confirmed but was completely nitrogenated even in the nitrogenation pattern 1 having a low nitrogen partial pressure. In the samples in which silicon was melted, the molten silicon became a cause of destruction causing the strength to be greatly decreased.

Example 5
(Samples Nos. 4-16 to 4-22))

As main components, an $Si_3N_4$ powder having an α-ratio of 90% and an average particle diameter of 0.9 μm and a silicon powder having a particle diameter of 3.7 μm were mixed together at various ratios, and to which were added, as sintering assistants, 2.5 mol % of the $Y_2O_3$ powder, 3.0 mol % of the $Al_2O_3$ powder and 5 mol % of the $SiO_2$ powder, which were the same powders as those used in Example 4. Then, $WO_3$ and $MnO_2$ were added thereto each in an amount of 0.5 parts by weight as nitrogenation promoting agents.

The mixture powder was pulverized, mixed, granulated, molded and dewaxed in the same manner as in Example 4. The molded article was nitrogenated in an atmosphere of a nitrogen partial pressure of 0.5 atms, and was further treated at 1700° C. for 5 hours and at 2000° C. for 2 hours to obtain a dense sintered product. The sintered product was cut to observe the cross section and to check the residual silicon by the X-ray diffraction method. Furthermore, the contraction of size was measured relative to the molded article of the sintered product. The results were as shown in Table 4.

According to the results of Table 4, when $Si/(Si+Si_3N_4)$ was larger than 0.95 (sample No. 4-16), silicon melted due to heat produced by the quick nitrogenation reaction and was coagulated in the center of the sample. When $Si/(Si+Si_3N_4)$ was smaller than 0.2 (samples Nos. 4-21, 4-22), furthermore, the molded articles contracted greatly.

Example 6
(Samples Nos. 4-23 to 4-27))

As main components, $Si_3N_4$ powders having different α-ratios (average particle diameter was not larger than 2 μm) and a silicon powder having an average particle diameter of 7.0 μm were mixed together at a ratio of $Si/(Si+Si_3N_4)=0.75$, and to which were added, as sintering assistants, 2.5 mol % of the $Y_2O_3$ powder, 3.0 mol % of the $Al_2O_3$ powder and 5 mol % of the $SiO_2$ powder, which were the same powders as those used in Example 4. Then, $WO_3$ and $MnO_2$ were added thereto each in an amount of 0.5 parts by weight as nitrogenation promoting agents.

The mixture powder was pulverized, mixed, granulated, molded and dewaxed in the same manner as in Example 4. The molded article was nitrogenated in an atmosphere of a nitrogen partial pressure of 0.5 atms, and was further treated at 1750° C. for 5 hours and at 1900° C. for 2 hours to obtain a dense sintered product. Ten test pieces having a shape specified under JIS-R1601 were cut from each of the sintered products, and were measured for their strength at normal temperature and at 1000° C. The results were as shown in Table 5.

According to the results of Table 5, when the $Si_3N_4$ powder having an α-ratio of not smaller than 50% was used, the molded article exhibited a large strength at normal temperature (samples Nos. 4-23 to 4-26).

When the α-ratio was smaller than 50% (sample No. 4-27), however, the strength at normal temperature was low. The shrinkage rates of these samples were all from 12.5 to 12.7%.

Example 7
(Samples Nos. 4-28 to 4-32))

As main components, an $si_3N_4$ powder having an α-ratio of 90% and a silicon powder having an average particle diameter of 7.0 μm were used. The $Si_3N_4$ powder used here possessed an initial average particle diameter of 4.5 μm. Therefore, the $Si_3N_4$ powder was adjusted for its particle diameter by pre-pulverization to possess particle diameters as represented by the samples Nos. 4-28 to 4-30 in Table 5. Furthermore, silicon and $Si_3N_4$ were mixed together at a ratio of $Si/(Si+Si_3N_4)=0.75$, and to which were added, as sintering assistants, 2.5 mol % of the $Y_2O_3$ powder, 3.0 mol % of the $Al_2O_3$ powder and 5 mol % of the $SiO_2$ powder, which were the same powders as those used in Example 4. Then, $WO_3$ and $MnO_2$ were added thereto each in an amount of 0.5 parts by weight as nitrogenation promoting agents.

The mixture powder was pulverized, mixed, granulated, molded and dewaxed in the same manner as in Example 4. The molded article was then nitrogenated in an atmosphere of a nitrogen partial pressure of 0.5 atms, and was further treated at 1750° C. for 5 hours and at 1900° C. for 2 hours to obtain a dense sintered product. Ten test pieces having a shape specified under JIS-R1601 were cut from each of the sintered products, and were measured for their strength at normal temperature and at 1000° C. The results were as shown in Table 5.

According to the results of Table 5, when the $Si_3N_4$ powder having an average particle diameter of not larger than 3 μm was used, the molded article exhibited a large strength at normal temperature (samples Nos- 4-30 to 4-32). When the average particle diameter exceeded 3 μm (samples Nos. 4-28, 4-29), however, the strength at normal temperature tended to decrease. The shrinkage rates of these samples were all from 12.5 to 12.7%.

Example 8
(Samples Nos. 4-33 to 4-57))

As main components, an $Si_3N_4$ powder having an α-ratios of 90% and an average particle diameter of 0.9 μm, and a silicon powder having an average particle diameter of 3.7 μm were mixed together at a ratio of $Si/(Si+Si_3N_4)=0.75$, and to which were added, as sintering assistants, a powder of an oxide of an element of the Group 3a of periodic table, an $Al_2O_3$ powder and an $SiO_2$ powder in such a total amount together with the oxygen component contained in the silicon powder or in the $Si_3N_4$ powder which was the main component, that the compositions of Tables 5 and 6 were obtained.

Then, $WO_3$ and $MnO_2$ were added thereto as nitrogenation promoting agents at ratios shown in Tables 5 and 6.

The mixture powder was pulverized, mixed, granulated, molded and dewaxed in the same manner as in Example 4.

The molded article was nitrogenated in an atmosphere of a nitrogen partial pressure of 0.5 atms, and was further treated at 1750° C. for 5 hours and at 1900° C. for 2 hours to obtain a dense sintered product. Ten test pieces having a shape specified under JIS-R1601 were cut from each of the sintered products, and were measured for their strength at normal temperature and at 1000° C. The results were as shown in Tables 5 and 6.

According to the results of Tables 5 and 6, when the oxide of an element of the Group 3a of periodic table was added in an amount of 1 to 7 mol %, the aluminum oxide was added in an amount of 1 to 13 mol %, or the oxygen component contained in the added silicon powder or in the $Si_3N_4$ powder was added in an amount of 1 to 25 mol % reckoned as $SiO_2$ or in a total amount with the $SiO_2$ powder that was added, the molded articles exhibited large strengths both at normal temperature and at high temperatures. The oxide of any element of the Group 3a of periodic table exhibited satisfactory properties. The shrinkage rates of these samples were all from 12.5 to 12.7%.

TABLE 4

| Sample No. | Ave. particle diameter of starting $Si_3N_4$ (μm) | α-Ratio (%) | Ave. particle diameter of starting Si (μm) | $\overline{Si_3N_4 + Si}$ | Nitrosensation promotor (prts. by wt.)*1) | D90 (μm) | Residual Si $N_2$ partial pressure(atm) 0.5 | 1 | Shrinkage rate (%) | Strength at room temp. (MPa) $N_2$ partial pressure (atm) 0.5 | 1 |
|---|---|---|---|---|---|---|---|---|---|---|---|
| *4-1 | 0.9 | 90 | 1.5 | 0.75 | — | 0.9 | yes | yes | 13.1 | 500 | 460 |
| 4-2 | 0.9 | 90 | 2.5 | 0.75 | — | 1.1 | yes | no | 12.9 | 520 | 760 |
| 4-3 | 0.9 | 90 | 7.0 | 0.75 | — | 1.6 | no | no | 12.6 | 790 | 810 |
| 4-4 | 0.9 | 90 | 17.0 | 0.75 | — | 2.0 | no | no | 12.4 | 810 | 800 |
| 4-5 | 0.9 | 90 | 28.0 | 0.75 | — | 4.5 | no | no | 12.2 | 710 | 760 |
| *4-6 | 0.9 | 90 | 35.0 | 0.75 | — | 7.0 | yes | yes | 12.1 | 520 | 460 |
| *4-7 | 0.9 | 90 | 1.5 | 0.75 | $WO_3$0.5, $MnO_2$0.5 | 0.6 | yes | yes | 13.2 | 460 | 320 |
| 4-8 | 0.9 | 90 | 2.5 | 0.75 | $WO_3$0.5, $MnO_2$0.5 | 1.2 | no | no | 12.9 | 750 | 760 |
| 4-9 | 0.9 | 90 | 7.0 | 0.75 | $WO_3$0.5, $MnO_2$0.5 | 1.9 | no | no | 12.6 | 790 | 780 |
| 4-10 | 0.9 | 90 | 2.5 | 0.75 | $WO_3$0.5 | 1.2 | no | no | 12.9 | 770 | 780 |
| 4-11 | 0.9 | 90 | 2.5 | 0.75 | $WO_3$0.5 | 1.4 | no | no | 12.8 | 790 | 620 |
| 4-12 | 0.9 | 90 | 2.5 | 0.75 | $WSi_2$0.5 | 1.3 | no | no | 12.9 | 750 | 800 |
| 4-13 | 0.9 | 90 | 2.5 | 0.75 | $MnO_2$0.5 | 1.3 | no | no | 13.0 | 760 | 800 |
| 4-14 | 0.9 | 90 | 2.5 | 0.75 | $Re_2O_3$0.5 | 1.1 | no | no | 12.9 | 750 | 810 |
| 4-15 | 0.9 | 90 | 2.5 | 0.75 | CuO 0.5 | 1.3 | no | no | 13.6 | 770 | 790 |
| *4-16 | — | — | 7.0 | 1.0 | $WO_3$0.5, $MnO_2$0.5 | 2.5 | yes | — | 10.9 | 450 | — |
| 4-17 | 0.9 | 90 | 7.0 | 0.95 | $WO_3$0.5, $MnO_2$0.5 | 2.2 | no | — | 11.2 | 760 | — |
| 4-18 | 0.9 | 90 | 7.0 | 0.75 | $WO_3$0.5, $MnO_2$0.5 | 1.6 | no | — | 12.6 | 830 | — |
| 4-19 | 0.9 | 90 | 7.0 | 0.50 | $WO_3$0.5, $MnO_2$0.5 | 1.4 | no | — | 14.7 | 840 | — |
| 4-20 | 0.9 | 90 | 7.0 | 0.20 | $WO_3$0.5, $MnO_2$0.5 | 1.1 | no | — | 16.2 | 870 | — |
| *4-21 | 0.9 | 90 | 7.0 | 0.10 | $WO_3$0.5, $MnO_2$0.5 | 0.9 | no | — | 20.1 | 880 | — |
| *4-22 | 0.9 | 90 | — | — | $WO_3$0.5, $MnO_2$0.5 | 0.8 | no | — | 21.0 | 870 | — |

Those marked with * lie outside the scope of the invention.
*1)The amount of the nitrogenation promoting agent is with respect to 100 parts by weight of the main components of Si (reckoned as $Si_3N_4$), $Si_3N_4$ and sintering assistants.

TABLE 5

| Sample No. | Ave. particle diameter of starting $Si_3N_4$(μm) | α-Ratio (%) | Ave. particle diameter of starting Si (μm) | $\overline{Si_3N_4 + Si}$ | $RE_2O_3$ (mol %) | $Al_2O_3$ (mol %) | $SiO_2$ (mol %) | Nitrogenation promotor (prts. by wt.)*1) | D90 (μm) | Strength (MPa) Room temp. | 1000 ° C. | Max. void diameter (μm) |
|---|---|---|---|---|---|---|---|---|---|---|---|---|
| 4-23 | 0.7 | 98 | 7.0 | 0.75 | $Y_2O_3$ 2.5 | 3.0 | 5.0 | $WO_3$ 0.5 | 1.5 | 930 | 790 | 10 |
| 4-24 | 0.9 | 90 | 7.0 | 0.75 | $Y_2O_3$ 2.5 | 3.0 | 5.0 | $WO_3$ 0.5 | 1.6 | 870 | 750 | 10 |
| 4-25 | 1.2 | 70 | 7.0 | 0.75 | $Y_2O_3$ 2.5 | 3.0 | 5.0 | $WO_3$ 0.5 | 1.6 | 820 | 730 | 20 |
| 4-26 | 1.0 | 50 | 7.0 | 0.75 | $Y_2O_3$ 2.5 | 3.0 | 5.0 | $WO_3$ 0.5 | 1.5 | 760 | 680 | 10 |
| *4-27 | 1.5 | 30 | 7.0 | 0.75 | $Y_2O_3$ 2.5 | 3.0 | 5.0 | $WO_3$ 0.5 | 1.9 | 610 | 590 | 20 |
| 4-28 | 4.5 | 90 | 7.0 | 0.75 | $Y_2O_3$ 2.5 | 3.0 | 5.0 | $WO_3$ 0.5 | 3.1 | 710 | 600 | 40 |
| 4-29 | 3.6 | 90 | 7.0 | 0.75 | $Y_2O_3$ 2.5 | 3.0 | 5.0 | $WO_3$ 0.5 | 2.6 | 720 | 620 | 30 |
| 4-30 | 3.0 | 90 | 7.0 | 0.75 | $Y_2O_3$ 2.5 | 3.0 | 5.0 | $WO_3$ 0.5 | 2.2 | 010 | 750 | 30 |
| 4-31 | 1.5 | 90 | 7.0 | 0.75 | $Y_2O_3$ 2.5 | 3.0 | 5.0 | $WO_3$ 0.5 | 1.8 | 850 | 780 | 20 |
| 4-32 | 0.4 | 90 | 7.0 | 0.75 | $Y_2O_3$ 2.5 | 3.0 | 5.0 | $WO_3$ 0.5 | 1.2 | 990 | 850 | 5 |
| 4-33 | 0.9 | 90 | 7.0 | 0.75 | $Y_2O_3$ 2.5 | 3.0 | 5.0 | $WO_3$ 0.5 | 1.5 | 880 | 720 | 10 |
| 4-34 | 0.9 | 90 | 7.0 | 0.75 | $Yb_2O_3$ 2.5 | 3.0 | 5.0 | $WO_3$ 0.5 | 1.6 | 920 | 800 | 10 |
| 4-35 | 0.9 | 90 | 7.0 | 0.75 | $Er_2O_3$ 2.5 | 3.0 | 5.0 | $WO_3$ 0.5 | 1.5 | 910 | 790 | 10 |
| 4-36 | 0.9 | 90 | 7.0 | 0.75 | $Mo_2O_3$ 2.5 | 3.0 | 5.0 | $WO_3$ 0.5 | 1.4 | 860 | 710 | 10 |
| 4-37 | 0.9 | 90 | 7.0 | 0.75 | $Dy_2O_3$ 2.5 | 3.0 | 5.0 | $WO_3$ 0.5 | 1.6 | 860 | 700 | 10 |
| 4-38 | 0.9 | 90 | 7.0 | 0.75 | $Sn_2O_3$ 2.5 | 3.0 | 5.0 | $WO_3$ 0.5 | 1.7 | 850 | 670 | 20 |

TABLE 5-continued

| Sample No. | Ave. particle diameter of starting Si₃N₄(μm) | α-Ratio (%) | Ave. particle diameter of starting Si (μm) | $\frac{Si}{Si_3N_4 + Si}$ | RE₂O₃ (mol %) | Al₂O₃ (mol %) | SiO₂ (mol %) | Nitrogenation promotor (prts. by wt.)*1) | D90 (μm) | Strength (MPa) Room temp. | Strength (MPa) 1000° C. | Max. void dimeter (μm) |
|---|---|---|---|---|---|---|---|---|---|---|---|---|
| 4-39 | 0.9 | 90 | 7.0 | 0.75 | Nd₂O₃ 2.5 | 3.0 | 5.0 | WO₃ 0.5 | 1.4 | 820 | 650 | 30 |
| 4-40 | 0.9 | 90 | 7.0 | 0.75 | Ce₂O₃ 2.5 | 3.0 | 5.0 | WO₃ 0.5 | 1.5 | 800 | 650 | 30 |
| 4-41 | 0.9 | 90 | 7.0 | 0.75 | Y₂O₃ 1.0 | 3.0 | 5.0 | WO₃ 0.5 | 1.4 | 830 | 720 | 20 |
| 4-42 | 0.9 | 90 | 7.0 | 0.75 | Y₂O₃ 5.0 | 3.0 | 5.0 | WO₃ 0.5 | 1.6 | 860 | 720 | 20 |
| 4-43 | 0.9 | 90 | 7.0 | 0.75 | Y₂O₃ 7.0 | 3.0 | 5.0 | WO₃ 0.5 | 1.5 | 810 | 670 | 20 |

Those marked with * lie outside the scope of the invention.
*1)The amount of the nitrogenation promoting agent is with respect to 100 parts by weight of the main components of Si (reckoned as Si₃N₄), Si₃N₄ and sintering assistants.

TABLE 6

| Sample No. | Ave. particle diameter of starting Si₃N₄(μm) | α-ratio (%) | Ave. particle diameter of starting Si (μm) | $\frac{Si}{Si_3N_4 + Si}$ | RE₂O₃ (mol %) | Al₂O₃ (mol %) | SiO₂ (mol %) | Nitrogenation promotor (prts. by wt.)*1) | D90 (μm) | Strength (MPa) Room temp. | Strength (MPa) 1000° C. | Max. void diameter (μm) |
|---|---|---|---|---|---|---|---|---|---|---|---|---|
| 4-44 | 0.9 | 90 | 7.0 | 0.75 | Y₂O₃ 2.5 | 1.0 | 5.0 | WO₃0.5, MnO₂0.5 | 1.5 | 760 | 660 | 20 |
| 4-45 | 0.9 | 90 | 7.0 | 0.75 | Y₂O₃ 2.5 | 5.0 | 5.0 | WO₃0.5, MnO₂0.5 | 1.5 | 880 | 720 | 10 |
| 4-46 | 0.9 | 90 | 7.0 | 0.75 | Y₂O₃ 2.5 | 5.0 | 5.0 | WO₃0.5, MnO₂0.5 | 1.4 | 810 | 700 | 10 |
| 4-47 | 0.9 | 90 | 7.0 | 0.75 | Y₂O₃ 2.5 | 13.0 | 5.0 | WO₃0.5, MnO₂0.5 | 1.4 | 770 | 690 | 20 |
| 4-48 | 0.9 | 90 | 7.0 | 0.75 | Y₂O₃ 2.5 | 3.0 | 2.0 | WO₃0.5, MnO₂0.5 | 1.6 | 810 | 700 | 10 |
| 4-49 | 0.9 | 90 | 7.0 | 0.75 | Y₂O₃ 2.5 | 3.0 | 10.0 | WO₃0.5, MnO₂0.5 | 1.5 | 860 | 750 | 10 |
| 4-50 | 0.9 | 90 | 7.0 | 0.75 | Y₂O₃ 2.5 | 3.0 | 20.0 | WO₃0.5, MnO₂0.5 | 1.5 | 820 | 720 | 20 |
| 4-51 | 0.9 | 90 | 7.0 | 0.75 | Y₂O₃ 2.5 | 3.0 | 25.0 | WO₃0.5, MnO₂0.5 | 1.4 | 770 | 670 | 40 |
| 4-52 | 0.9 | 90 | 7.0 | 0.75 | Y₂O₃ 2.5 | 3.0 | 5.0 | WO₃0.1 | 1.6 | 830 | 700 | 20 |
| 4-53 | 0.9 | 90 | 7.0 | 0.75 | Y₂O₃ 2.5 | 3.0 | 5.0 | WO₃2.0 | 1.6 | 860 | 750 | 10 |
| 4-54 | 0.9 | 90 | 7.0 | 0.75 | Y₂O₃ 2.5 | 3.0 | 5.0 | WO₃5.0 | 1.5 | 800 | 690 | 20 |
| 4-55 | 0.9 | 90 | 7.0 | 0.75 | Y₂O₃ 2.5 | 3.0 | 5.0 | WO₃7.0 | 1.5 | 740 | 630 | 20 |
| 4-56 | 0.9 | 90 | 7.0 | 0.75 | Y₂O₃ 2.5 | 3.0 | 5.0 | WO₃0.5, MnO₂4.5 | 1.6 | 780 | 690 | 10 |
| 4-57 | 0.9 | 90 | 7.0 | 0.75 | Y₂O₃ 2.5 | 3.0 | 5.0 | WO₃0.5, MnO₂7.0 | 1.5 | 730 | 620 | 20 |

We claim:

1. Ceramic granules comprising:
    silicon nitride ($Si_3N_4$) containing not less than 50% of α-silicon nitride;
    elemental silicon (Si);
    an assistant additive which contains a sintering assistant; and
    an organic binder;
    wherein said ceramic granules have an average particle diameter of from 50 to 300 μm and a relative density A(%) of from 18 to 30%, A(%) being defined by the following formula:

$$A(\%) = (B/C) \times 100$$

where B stands for a powder bulk density defined by the formula $$B(g/cm^3) = W(g)/100(cm^3)$$

where W(g) is a weight of an amount of the granules, from which the organic binder has been removed, that loosely fill a 100 cm³ capacity cylindrical vessel, and C stands for a theoretical true density of the mixture of the silicon nitride ($Si_3N_4$) powder, the elemental silicon (Si) powder and the assistant additive.

2. The ceramic granules according to claim 1, wherein the sintering assistant comprises an oxide of the group 3a element in the periodic table and aluminum oxide.

3. The ceramic granules according to claim 2, wherein the assistant additive contains 1 to 7 mol % of the oxide of the group 3a element and 1 to 18 mol % of the aluminum oxide.

4. The ceramic granules according to claim 1, wherein the assistant additive further contains a nitrogenation-promoting assistant which comprises at least one compound selected from the group consisting of oxides, carbides and silicides of W, Mn, Fe or Cu.

5. The ceramic granules of claim 1, wherein the amount of the organic binder is 4 to 25 parts by weight of the organic binder per 100 parts by weight of the total amount of the silicon nitride, silicon and assistant additive.

6. The ceramic granules of claim 1, wherein the granules are obtained by granulating a mixture of a powder of the silicon nitride ($Si_3N_4$), a powder of the elemental silicon (Si), the assistant additive and the organic binder.

7. The ceramic granules of claim 1, wherein the silicon nitride ($Si_3N_4$) and the elemental silicon (Si) exist as particles respectively at a weight ratio $Si/(Si+Si_3N_4)$ of not smaller than 0.5.

8. A process for the preparation of ceramic granules comprising:
    preparing a powder mixture comprising a silicon nitride ($Si_3N_4$) powder containing not less than 50% of α-silicon nitride, a silicon (Si) powder and an assistant additive that contains a sintering assistant, said powder mixture having a 90%-integral particle diameter (D90), calculated by integrating a particle size distribution diagram, of from 1 to 5 µm;

mixing the powder mixture with an organic binder;

granulating the mixture of the powder mixture with the organic binder to form ceramic granules having an average particle diameter of from 50 to 300 µm and a relative density A(%) of from 18 to 30%, A(%) being defined by the following formula:

$$A(\%)=(B/C)\times 100$$

where B stands for a powder bulk density defined by the formula $$B(g/cm^3)=W(g)/100(cm^3)$$

where W(g) is a weight of an amount of the granules, from which the organic binder has been removed, that loosely fill a 100 cm³ capacity cylindrical vessel, and C stands for a theoretical true density of the powder mixture.

9. The process according to claim 8, wherein the sintering assistant comprises an oxide of the group 3a element in the periodic table and aluminum oxide.

10. The process according to claim 9, wherein the assistant additive contains 1 to 7 mol % of the oxide of the group 3a element and 1 to 18 mol % of the aluminum oxide.

11. The process to claim 8, wherein the assistant additive further contains a nitrogenation-promoting assistant which comprises at least one compound selected from the group consisting of oxides, carbides and silicides of W, Mn, Fe or Cu.

12. The method of claim 8, wherein the powder mixture is mixed with the organic binder in a ratio of 4 to 25 parts by weight of the organic binder per 100 parts by weight of the powder mixture.

13. The process of claim 8, wherein the granulating step comprises agitating the mixture of the powder mixture with the organic binder until the granules attain the average diameter and the relative density.

14. Ceramic granules formed by the method of claim 8.

15. The process of claim 8, wherein the silicon (Si) powder is used in the powder mixture at a weight ratio Si/(Si+Si₃N₄) of not smaller than 0.5.

16. A process for producing a silicon nitride sintered body comprising:

preparing a powder mixture comprising a silicon nitride (Si₃N₄) powder containing not less than 50% of α-silicon nitride, a silicon (Si) powder and an assistant additive that contains a sintering assistant, the powder mixture having a 90%-integral particle diameter (D90), calculated by integrating a particle size distribution diagram, of from 1 to 5 µm;

mixing the powder mixture with an organic binder;

granulating the mixture of the powder mixture with the organic binder to form ceramic granules having an average particle diameter of from 50 to 300 µm and a relative density A(%) of from 18 to 30%, A(%) being defined by the following formula:

$$A(\%)=(B/C)\times 100$$

where B stands for a powder bulk density defined by the formula $$B(g/cm^3)=W(g)/100(cm^3)$$

where W(g) is a weight of an amount of the granules, from which the organic binder has been removed, that loosely fill a 100 cm³ capacity cylindrical vessel, and C stands for a theoretical true density of the powder mixture;

press-molding the ceramic granules to form a mold body having a relative density of from 40 to 65%;

heat-treating the body to decompose and remove the organic binder;

nitrogenizing the heat-treated body in nitrogen gas atmosphere at a temperature of from 1000 to 1500° C. to convert the silicon in the body into silicon nitride; and firing the nitrogenized mold body in a non-oxidative atmosphere at a temperature of from 1700 to 2000° C. to form the silicon nitride sintered body.

17. The process according to claim 16, wherein the sintering assistant comprises an oxide of the group 3a element in the periodic table and aluminum oxide.

18. The process according to claim 17, wherein the assistant additive contains 1 to 7 mol % of the oxide of the group 3a element and 1 to 18 mol % of the aluminum oxide.

19. The process to claim 16, wherein the assistant additive further contains a nitrogenation-promoting assistant which comprises at least one compound selected from the group consisting of oxides, carbides and silicides of W, Mn, Fe or Cu.

20. The method of claim 16, wherein the powder mixture is mixed with the organic binder in a ratio of 4 to 25 parts by weight of the organic binder per 100 parts by weight of the powder mixture.

21. The process of claim 16, wherein the granulating step comprises agitating the mixture of the powder mixture with the organic binder until the granules attain the average diameter and the relative density.

22. The process according to claim 16, wherein the sintered body has a maximum void diameter not greater than 60 µm.

* * * * *